No. 654,754. Patented July 31, 1900.
B. F. NICKERSON.
SPINDLE PROTECTOR FOR VEHICLES.
(Application filed May 12, 1900.)
(No Model.)
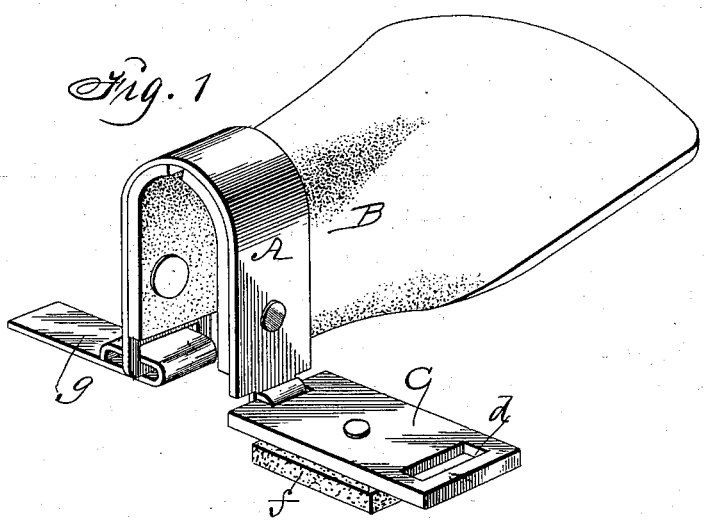
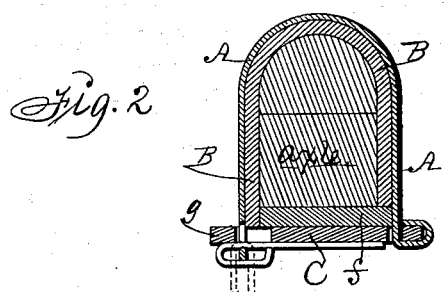
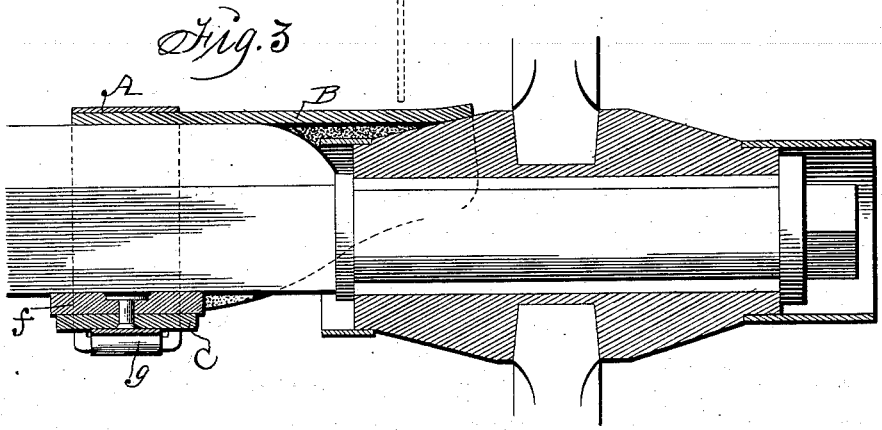

UNITED STATES PATENT OFFICE.

BENJAMIN F. NICKERSON, OF WEBSTER CITY, IOWA.

SPINDLE-PROTECTOR FOR VEHICLES.

SPECIFICATION forming part of Letters Patent No. 654,754, dated July 31, 1900.

Application filed May 12, 1900. Serial No. 16,427. (No model.)

*To all whom it may concern:*

Be it known that I, BENJAMIN F. NICKERSON, a citizen of the United States, residing at Webster City, in the county of Hamilton and State of Iowa, have invented a new and useful Spindle-Protector for Vehicles, of which the following is a specification.

My object is to prevent dirt and gritty matter from getting into the hub of a wheel to mix with lubricating matter on the spindle and also to prevent weeds and other matter from lodging and winding and fastening on an axle and hub, as frequently occurs, to cause annoyance and to require time and labor for removing such objectionable matter.

My invention consists in the construction and application of a shield to an axle and hub of a vehicle, as hereinafter set forth, pointed out in my claim, and illustrated in the accompanying drawings, in which—

Figure 1 is a perspective view of my invention ready to be applied. Fig. 2 is a transverse sectional view of that portion that is adapted to be keyed fast to an axle. Fig. 3 is a longitudinal sectional view of my attachment detachably connected with an axle and hub as required for practical use.

The letter A designates a U-shaped metal frame adapted to be placed astride the axle of a vehicle.

B is a flexible shield preferably made of rubber and one end fitted in and fixed to the metal frame A by means of rivets or in any suitable way, so as to allow the body portion of the shield to be extended over the inner end portion of the hub of a wheel, as shown in Fig. 3, to cover the end portion of the hub and the open space between the hub and axle.

C is a flat metal plate hinged to one end of the frame A and provided with a slot $d$ at its free end to permit the passage of a metal key. A flat piece of elastic material $f$, preferably rubber, is riveted or otherwise fixed to the under side of the metal plate C. A metal key $g$ is hinged to the other end of the frame A in such a manner that it can slide longitudinally. This is accomplished by forming an elongated eye on the end of the key, as shown in Figs. 1 and 2, or in any suitable way, so as to produce a hinge and also a sliding movement of the key relative to the plate C, as required for detachably fastening the complete device to an axle.

To attach the device to an axle, it is only necessary to place it astride of it and bring the hinged plate C across the bottom of the axle after the free end of the key is passed through the slot in the free end of the plate, so that in pressing the plate up against the bottom of the axle the key will pass through the plate and the lower end portion of the frame will also project through the slot and allow the key to be pressed backward and into horizontal position, as shown in Fig. 2, and to lock the device securely to the axle. The rubber plate $f$ will, by its resiliency when clamped against the bottom of the axle, prevent rattling and aid in keeping the key in its position. A reverse sliding motion of the key allows the key to depend, as indicated by dotted lines in Fig. 2, so that the plate C can swing away from the bottom of the axle and the frame A and shield B lifted from the axle.

Having described the purpose, construction, and application of my invention, its practical utility will be obvious to persons familiar with the art to which it pertains.

What I claim as new, and desire to secure by Letters Patent therefor, is—

An attachment for vehicles comprising a metal frame, a flexible shield fixed to the frame, a metal plate hinged to one end portion of the frame, a key slidably hinged to the other end of the frame and adapted to pass through a slot in the free end of the hinged plate, and an elastic plate fixed to the hinged plate, arranged and combined to operate in the manner set forth for the purposes stated.

BENJAMIN F. NICKERSON.

Witnesses:
A. W. LITTLE,
JAS. H. DANIELS.